US010811782B2

(12) United States Patent
Quarfoth et al.

(10) Patent No.: US 10,811,782 B2
(45) Date of Patent: Oct. 20, 2020

(54) HOLOGRAPHIC ANTENNA ARRAYS WITH PHASE-MATCHED FEEDS AND HOLOGRAPHIC PHASE CORRECTION FOR HOLOGRAPHIC ANTENNA ARRAYS WITHOUT PHASE-MATCHED FEEDS

(71) Applicant: HRL Laboratories, LLC, Malibu, CA (US)

(72) Inventors: Ryan G. Quarfoth, Los Angeles, CA (US); Keerti S. Kona, Woodland Hills, CA (US); Daniel Gregoire, Los Angeles, CA (US)

(73) Assignee: HRL Laboratories, LLC, Malibu, CA (US)

( * ) Notice: Subject to any disclaimer, the term of this patent is extended or adjusted under 35 U.S.C. 154(b) by 264 days.

(21) Appl. No.: 15/965,583

(22) Filed: Apr. 27, 2018

(65) Prior Publication Data

US 2019/0334234 A1 Oct. 31, 2019

(51) Int. Cl.

*H01Q 1/52* (2006.01)
*H01Q 15/00* (2006.01)
*H01Q 21/00* (2006.01)
*H01Q 3/44* (2006.01)
*H01Q 13/20* (2006.01)

(Continued)

(52) U.S. Cl.

CPC ........... *H01Q 15/0066* (2013.01); *H01Q 3/44* (2013.01); *H01Q 3/443* (2013.01); *H01Q 13/20* (2013.01); *H01Q 21/0006* (2013.01); *H01Q 21/061* (2013.01); *H01Q 3/28* (2013.01); *H01Q 3/30* (2013.01)

(58) Field of Classification Search

CPC ........................... H01Q 19/067; H01Q 21/068

See application file for complete search history.

(56) References Cited

U.S. PATENT DOCUMENTS 9,118,113 B2 * 8/2015 Mortazawi ......... H01Q 21/0006
2004/0227667 A1 * 11/2004 Sievenpiper ......... H01Q 15/008
343/700 MS (Continued)

FOREIGN PATENT DOCUMENTS

JP 2000-088944 A 3/2000

OTHER PUBLICATIONS

PCT International Search Report and Written Opinion from PCT/US2019/019677 dated Jun. 13, 2019.

(Continued)

*Primary Examiner* — Ab Salam Alkassim, Jr.
(74) *Attorney, Agent, or Firm* — Ladas & Parry

(57) ABSTRACT

A holographic antenna has plurality of conductive elements arranged in a series of the conductive elements, the series of conductive elements being grouped a number of different groups of said conductive elements, each of conductive elements in each different group of conductive elements being connected via one or more tuning elements to a neighboring conductive element in each the different group of conductive elements, each different group of conductive elements comprising a holographic antenna element of said holographic antenna. A plurality of amplifiers wherein each one of the plurality of amplifiers is connected at one end of each one of the different groups of conductive elements; and a feed system coupling each of said amplifiers to a RF connection of the holographic antenna.

19 Claims, 10 Drawing Sheets

(51) Int. Cl.
*H01Q 21/06* (2006.01)
*H01Q 3/28* (2006.01)
*H01Q 3/30* (2006.01)

(56) References Cited

U.S. PATENT DOCUMENTS

2005/0012667 A1* 1/2005 Noujeim ................ H01Q 23/00 343/700 MS
2005/0093737 A1* 5/2005 Schoebel ................ H01Q 3/36 342/175
2006/0187126 A1* 8/2006 Sievenpiper ......... H01Q 15/008 343/700 MS
2007/0091008 A1 4/2007 Mortazawi
2008/0297414 A1* 12/2008 Krishnaswamy ..... H03L 7/0995 342/368
2012/0050107 A1* 3/2012 Mortazawi ......... H01Q 21/0006 342/372
2012/0229359 A1* 9/2012 Lee ......................... H01Q 3/32 343/853
2012/0274528 A1* 11/2012 Apostolos .............. H01Q 13/28 343/785
2013/0266319 A1* 10/2013 Bodan .................. H01Q 21/068 398/79
2015/0009070 A1* 1/2015 Gregoire .................. H01Q 3/46 342/372
2015/0009071 A1* 1/2015 Gregoire ............ H01Q 21/0006 342/372
2015/0109178 A1* 4/2015 Hyde ................. H01Q 15/0006 343/772
2015/0214615 A1* 7/2015 Patel ...................... H01Q 13/28 342/372
2015/0372390 A1* 12/2015 Gregoire ................ H01Q 13/26 343/778
2018/0054004 A1* 2/2018 Driscoll ................ B64C 39/024
2018/0076521 A1* 3/2018 Mehdipour .......... H01Q 13/103
2019/0318146 A1* 10/2019 Trichopoulos ..... G06K 9/00087
2020/0083605 A1* 3/2020 Quarfoth .............. H01Q 13/206

OTHER PUBLICATIONS

M. ElSherbiny, A.E. Fathy, A. Rosen, G. Ayers, S.M. Perlow, "Holographic Antenna Concept, Analysis, and Parameters", IEEE Transactions on Antennas & Propagation, vol. 52, No. 3, pp. 830-839, Mar. 2004.

K. Iizuka, M. Mizusawa, S. Urasaki, H. Ushigome, "Volume-Type Holographic Antenna", IEEE Transactions on Antennas and Propagation, vol. 23, No. 6, pp. 807-810, Nov. 1975.

D.M. Pozar, "Flat Lens Antenna Concept Using Aperture Coupled Microstrip Patches", IEE Electronics Letters, vol. 32, No. 23, pp. 2109-2111, Nov. 1996.

Shaker , "Thick volume hologram for microwave frequency band: design, fabrication, and test", IEE Proc.—Microw, Antennas Propag., vol. 153, No. 5, Oct. 2006, p. 412-419.

N. Gagnon, A. Petosa, and D. McNamara, U.S. Pat. No. 8,743,000 issued Jun. 3, 2014.

Gregoire, D. J., J. S. Colburn, A. M. Patel, R. Quarfoth, and D. Sievenpiper, "A low profile electronically-steerable artificial-impedance-surface antenna," Electromagnetics in Advanced Applications (ICEAA), 2014 International Conference on, pp. 477-479. IEEE, 2014.

Quarfoth, Ryan G., Amit M. Patel, and Daniel J. Gregoire, "Ka-band electronically scanned artificial impedance surface antenna," Antennas and Propagation (APSURSI), 2016 IEEE International Symposium on, pp. 651-652. IEEE, 2016.

Oliner, A., and Alexander Hessel, "Guided waves on sinusoidally-modulated reactance surfaces," IRE Transactions on Antennas and Propagation 7, No. 5 (1959): 201-208.

Rusch, C., "Holographic Antennas" Springer International Publishing AG, 2015.

* cited by examiner

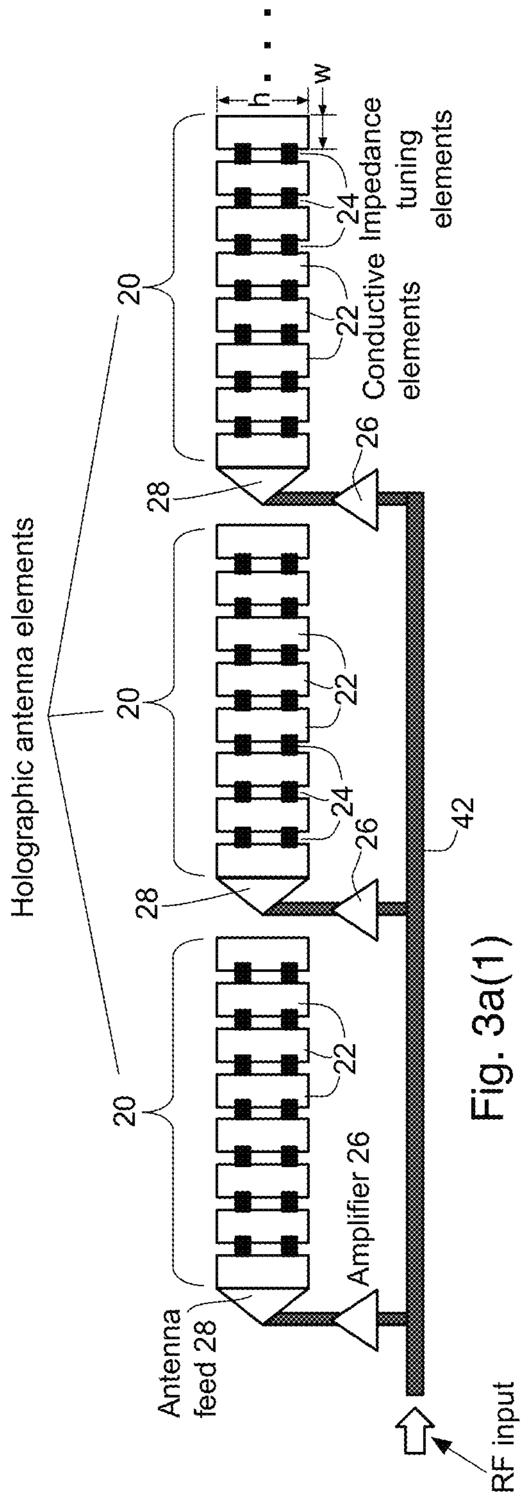
Fig. 3a(1)
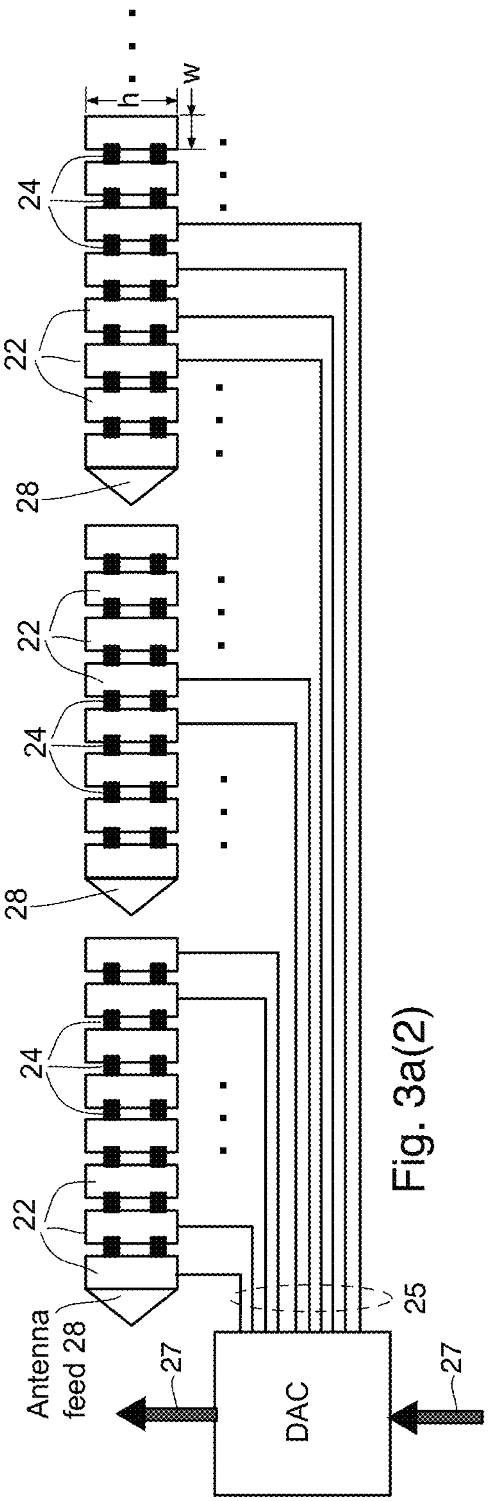
Fig. 3a(2)

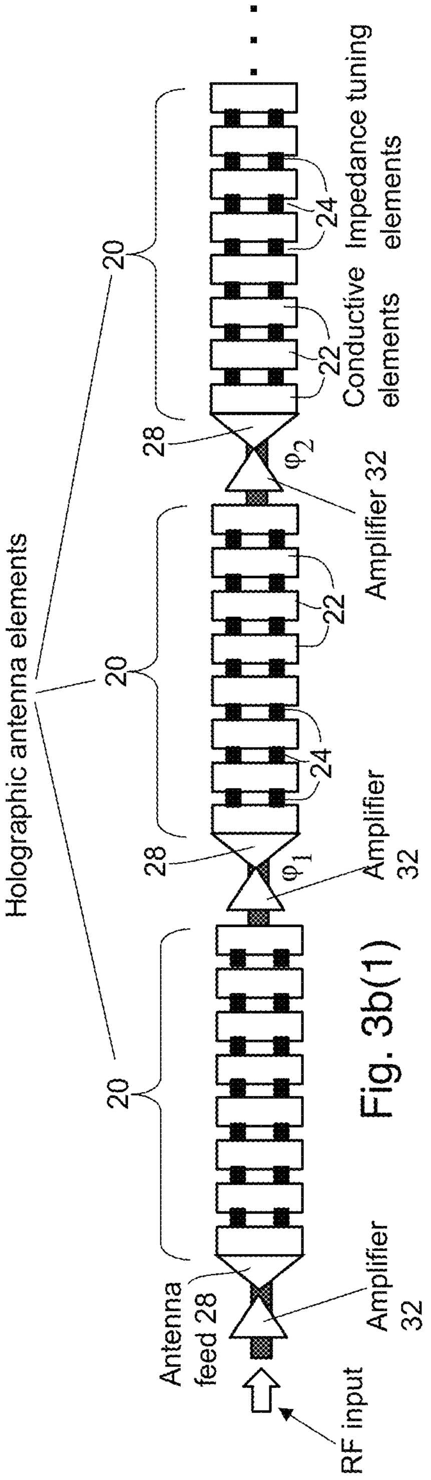
Fig. 3b(1)
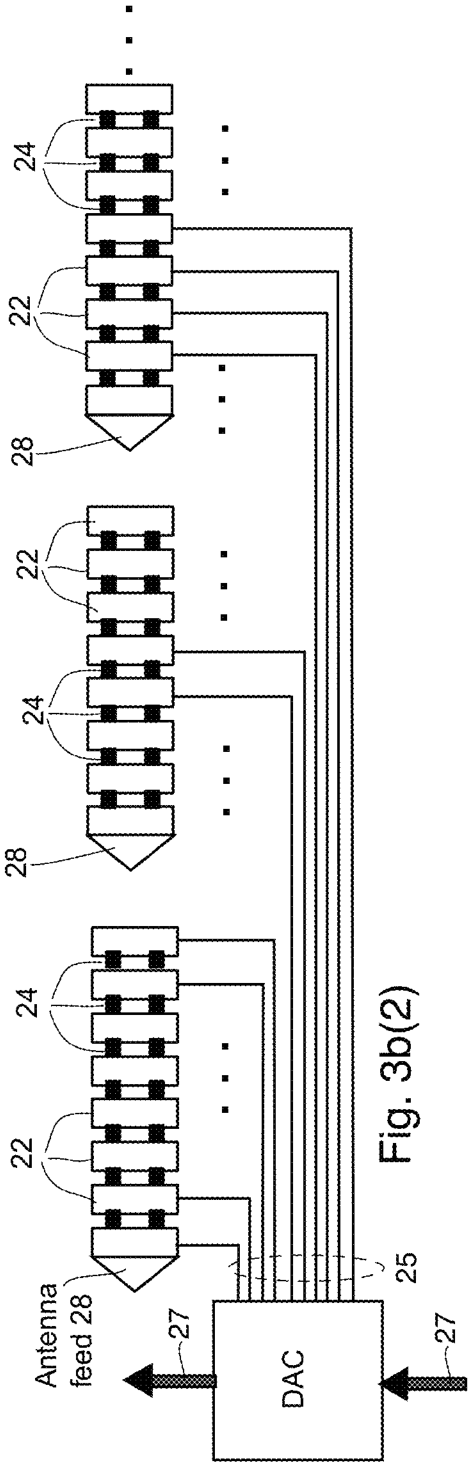
Fig. 3b(2)

HOLOGRAPHIC ANTENNA ARRAYS WITH PHASE-MATCHED FEEDS AND HOLOGRAPHIC PHASE CORRECTION FOR HOLOGRAPHIC ANTENNA ARRAYS WITHOUT PHASE-MATCHED FEEDS

CROSS REFERENCE TO RELATED APPLICATIONS

None.

STATEMENT REGARDING FEDERALLY SPONSORED RESEARCH OR DEVELOPMENT

None.

TECHNICAL FIELD

This invention relates to holographic antennas. Holographic antennas are a subset of traveling wave antennas, and are also known as periodic leaky wave antennas. A holographic antennas supports a slow-wave mode (i.e. non-radiating), that is spatially modulated (generally periodically), to create radiation. The hologram is the interference pattern between the slow-wave mode and a desired radiated pattern, and by applying the modulation, the slow wave is radiated with this pattern. In its simplest form, the hologram is a sinusoidal variation along the antenna which radiates a pencil beam in the far field. This type of hologram is useful for creating high-gain beams that could be useful to, for example, communication and radar systems.

BACKGROUND

The prior art includes:

(i) Phased arrays: holographic antennas are a lower cost solution due to the absence of phase shifters. Holographic antennas also have the ability to be electrically thin and conformal.

(ii) Series fed arrays: series fed arrays cannot scan in the plane of the array at a fixed frequency. These arrays are often scanned by changing the frequency which is not a viable option for various applications.

(iii) Traditional holographic: traditional prior-art holographic structures struggle to achieve electronic scanning from electrically long apertures because the series resistance in the tuning elements prevents the traveling mode from reaching the end of the antenna. By separating the feed network and phasing it to the traveling mode, an electrically-long array can be fed with appropriate phase without accruing absorption due to the tuning elements and without requiring additional phase shifters.

(iv) Holographic antennas with distributed amplification: prior art inventions have shown that embedding amplifiers along the antenna can mitigate issues due to absorption in the tuning elements. These issues are solved in transmit mode, but in receive mode, this architecture increases noise due to the cascading of amplification. In the current invention, amplifiers can be placed in parallel at each feed point without adding additional noise compared to phased arrays.

No prior art has been found which shows that an electronically scanned array can be fed without using phase shifters. For many types of leaky-wave arrays the beam is scanned either by changing the frequency or changing the phase velocity of the traveling mode. Frequency shifts are not feasible for many applications, while changing the phase velocity would put the antenna out of phase with the feed line. Holographic antennas are explicitly beneficial to this method because the average phase velocity of the traveling mode does not change with scan angle.

Prior art documents of possible interest include:

(1) E. Kock, "Microwave Holography", *Microwaves*, vol. 7, no. 11, pp. 46-54, November 1968.

(2) M. ElSherbiny, A. E. Fathy, A. Rosen, G. Ayers, S. M. Perlow, "Holographic Antenna Concept, Analysis, and Parameters", *IEEE Transactions on Antennas & Propagation*, vol. 52, No. 3, pp. 830-839, March 2004.

(3) K. Iizuka, M. Mizusawa, S. Urasaki, H. Ushigome, "Volume-Type Holographic Antenna", *IEEE Transactions on Antennas and Propagation*, vol. 23, No. 6, pp. 807-810, November 1975.

(4) D. M. Pozar, "Flat Lens Antenna Concept Using Aperture Coupled Microstrip Patches", *IEE Electronics Letters*, vol. 32, No. 23, pp. 2109-2111, November 1996.

(5) Shaker, "Thick volume hologram for microwave frequency band: design, fabrication, and test", *IEE Proc.—Microw, Antennas Propag.*, vol. 153, No. 5, October 2006, p. 412-419.

(6) N. Gagnon, A. Petosa, and D. McNamara, U.S. Pat. No. 8,743,000 issued Jun. 3, 2014.

(7) Gregoire, D. J., J. S. Colburn, A. M. Patel, R. Quarfoth, and D. Sievenpiper, "A low profile electronically-steerable artificial-impedance-surface antenna," *Electromagnetics in Advanced Applications* (*ICEAA*), 2014 *International Conference on*, pp. 477-479. IEEE, 2014.

(8) Quarfoth, Ryan G., Amit M. Patel, and Daniel J. Gregoire, "Ka-band electronically scanned artificial impedance surface antenna," *Antennas and Propagation* (*AP-SURSI*), 2016 *IEEE International Symposium on*, pp. 651-652. IEEE, 2016.

(9) Oliner, A., and Alexander Hessel, "Guided waves on sinusoidally-modulated reactance surfaces," *IRE Transactions on Antennas and Propagation* 7, no. 5 (1959): 201-208.

(10) Rusch, C., "Holographic Antennas" Springer International Publishing AG, 2015.

BRIEF DESCRIPTION OF THE INVENTION

In one embodiment, this invention provides an array of holographic antennas that is excited by a feed network that is phase matched to the traveling wave mode on the antenna without the need for phase shifters. In prior art, each element of an antenna array is fed with a phase shifter so that the radiation pattern of the antenna can be controlled. Prior art holographic antennas operate without phase shifters by using a single feed at the beginning of the antenna but it is difficult to make an electrically long, electrically-scanned antenna due to the series resistance of the tuning elements.

Holographic antennas are a subset of traveling wave antennas, and are also known as periodic leaky wave antennas. A holographic antennas supports a slow-wave mode (i.e. non-radiating), that is spatially modulated (generally periodically), to create radiation. The hologram is the interference pattern between the slow-wave mode and a desired radiated pattern, and by applying the modulation, the slow wave is radiated with this pattern. In its simplest form, the hologram is a sinusoidal variation along the antenna which radiates a pencil beam in the far field. This type of hologram is useful for creating high-gain beams that could be useful to, for example, communication systems.

In one aspect the present invention provides a holographic antenna having a RF connection, the holographic antenna comprising: a plurality of conductive elements arranged in a series of said conductive elements, said series of conductive elements being grouped a number of different groups of said conductive elements, each of conductive elements in each said different group of conductive elements being connected via one or more tuning elements to a neighboring conductive element in each said different group of conductive elements, each said different group of conductive elements comprising a holographic antenna element of said holographic antenna; a plurality of amplifiers, each one of said plurality of amplifiers being connected at an input end of each one of said different groups of conductive elements; and a feed system coupling each of said amplifiers to said RF connection.

In another aspect the present invention provides a holographic antenna comprising a plurality of conductive elements, the plurality of conductive elements being grouped into a plurality of different groups thereof, each different group having an associated amplifier for applying an amplifier RF signal to its associated group of conductive elements, each associated group of conductive elements having interconnecting tuning elements and each amplifier having a phase delay which is at least partially compensated for by applying appropriate signals to said tuning elements to thereby alter an impedance pattern of the associated group of conductive elements following their associated amplifier.

In yet another aspect the present invention provides a method for compensating for phase errors in a holographic antenna due to components, such as amplifiers having differing phase delays, by applying a counteracting phase shift to the holographic pattern of the antenna by changing the impedance imposed by tuning elements in the holographic antenna.

BRIEF DESCRIPTION OF THE DRAWINGS

FIGS. 3*a*(1) and 3*a*(2) depict one embodiment of the present invention which splits the holographic antenna into an array of shorter holographic antennas.

FIGS. 3*b*(1) and 3*b*(2) depict another embodiment which eliminates the feed line found in the embodiment of FIGS. 3*a*(1) and 3*a*(2) and places the amplifiers in series as opposed to parallel.

DETAILED DESCRIPTION

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Figure 1:
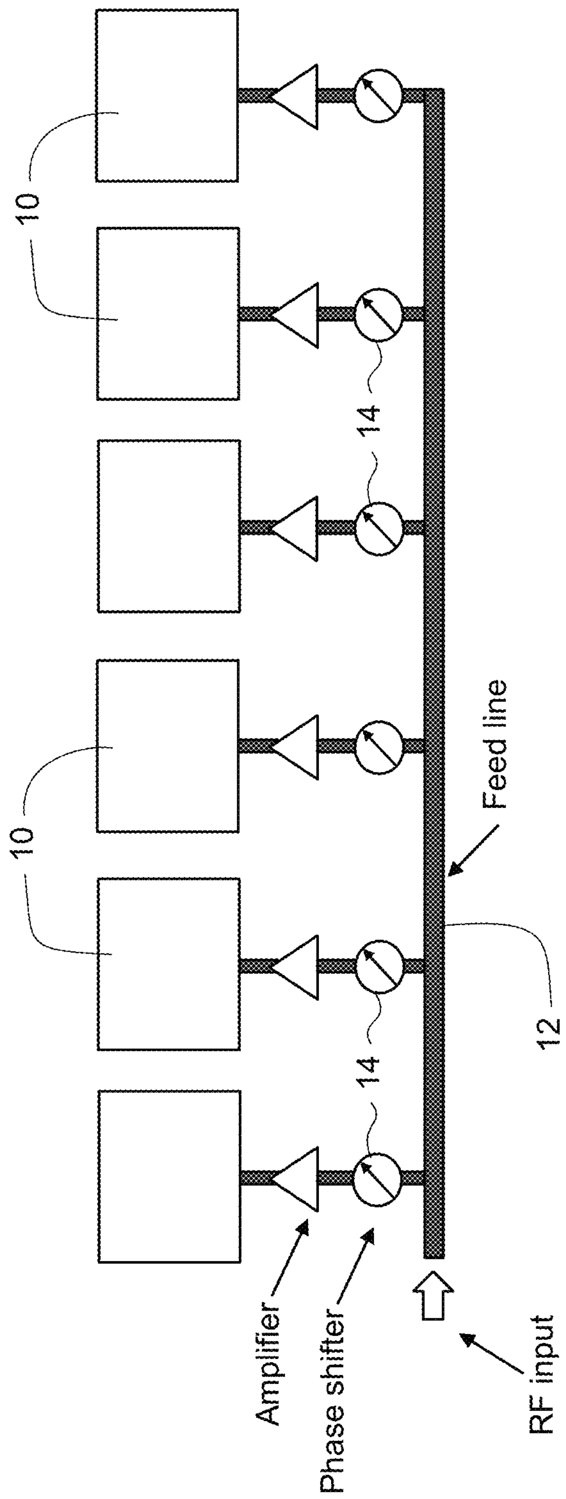
Fig. 1 prior art
FIG. 1 depicts a prior art phased array antenna.
Figure 2:
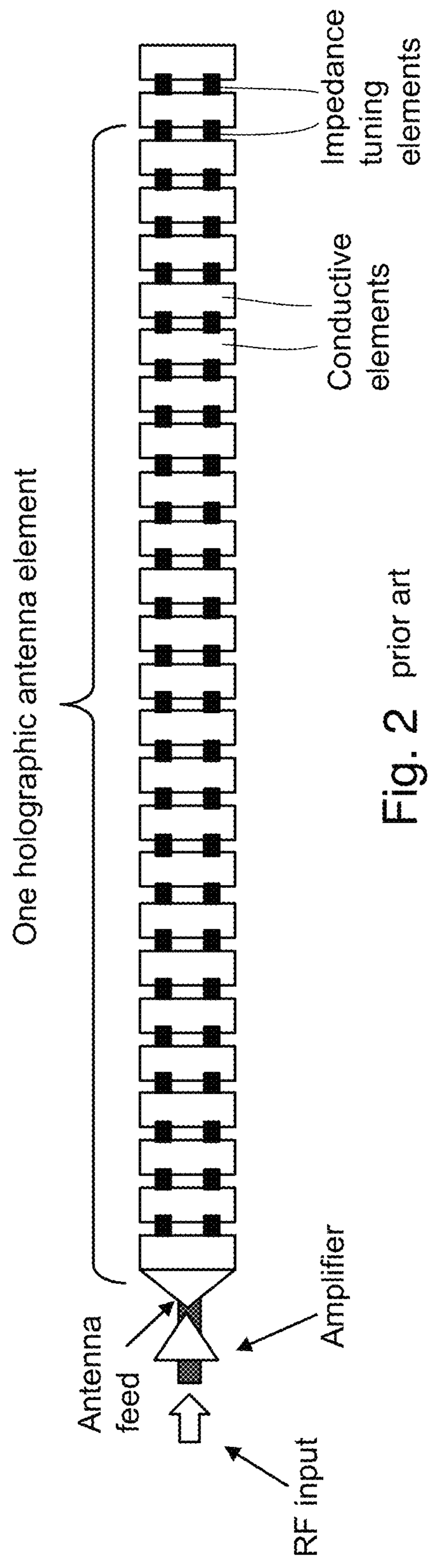
Fig. 2 prior art
FIG. 2 depicts a prior art design of a holographic antenna.

FIG. 1 shows a prior art phased array antenna which consists of multiple antenna elements 10 fed by a traveling feed 12. Phased arrays are often fed by corporate feeds as well which can have reduced beam squint. For both corporate and traveling feeds, the phased array antenna requires phase shifters 14 for each antenna element 10 in order to enable electronic beam scanning. A prior art holographic antenna, shown in FIG. 2, is advantageous compared to phased array of FIG. 1 because no phase shifters are necessary to achieve beam scanning. Instead, the beam is scanned by modulating the phase velocity of the traveling mode. Under this condition the antenna radiates an infinite number of spatial harmonics defined by:

$$\beta=k_0 \sin \theta+nk_p \quad \text{(Eqn. 1)}$$

where β is the wavenumber of the wave propagating along the antenna, $k_0$ is the wavenumber of free space, θ is the radiation angle with respect to normal (of the antenna), n is an integer which represents the spatial mode number and $k_p$ is the wavenumber of the modulation. The n=−1 mode is generally the most accessible modulation and other spatial modes predominantly have very minimal coupling or complex radiation angles when the n=−1 mode is excited.

A simple way to achieve a modulation $k_p$ is to sinusoidally vary the index of the traveling mode over the length of the antenna:

$$n_s(x)=n_{avg}+M \cos(k_p x) \quad \text{(Eqn. 2)}$$

where $n_s$ is the position varying index along the antenna, $n_{avg}$ is the average index along the antenna, M is the modulation depth, and x is the position.

FIG. 2 depicts a prior art design of a holographic antenna that consist of only a single antenna element or (not shown) multiple elements with series amplifiers that have no phase shift (like a negative impedance converter). See documents (7) through (10) identified above for a more in depth discussion of holographic antennas.

One possible embodiment of this technology is a series of metallic patches with sub-wavelength spacing and are each loaded with varactor diodes. The capacitance of the diodes is modulated in order to electronically control the radiation pattern. The drawback of this architecture is that these diodes (or other tuning elements) invariably have series resistance which causes the wave to be absorbed as it travels along the antenna. The result is that electrically long antennas cannot be created because the incident wave does not make it with a suitable amplitude to the end of the structure. See documents (7) and (8) identified above for a more in depth discussion.

An embodiment of the present invention overcomes this drawback by splitting the holographic antenna into an array of shorter holographic antennas 20 as is shown in the embodiment depicted by FIGS. 3*a*(1) and 3*a*(2). FIGS. 3*a*(1) and 3*a*(2) depict one embodiment, but FIG. 3*a*(1) depicts the RF signal paths (and omits controls signal paths) while FIG. 3*a*(2) shows the control signal paths (and omits RF signal paths) for clarity of illustration. In the embodiment of FIGS. 3*a*(1)/3*a*(2) the holographic antenna comprises a linear array of three shorter holographic antennas 20 (shown in both FIGS. 3*a*(1) and 3*a*(2)), it being understood that the number of shorter holographic antennas 20 in the linear array may be far greater than three, so long antenna lengths can be achieved without the traveling wave having to pass through the entire series of tuning elements 24 as is done in the prior art of FIG. 2. By incorporating a feed network with identical phase velocity, the embodiment of the holographic antenna of FIGS. 3*a*(1) and 3*a*(2) can still achieve beam scanning but without needing phase shifters like the traditional phased array of FIG. 1. The phase velocities should match closely enough so that any phase error between the feed network and the antenna is within 90 degrees over the entire length of the antenna.

FIGS. 3*b*(1) and 3*b*(2) depict another embodiment with shorter holographic antennas 20 disposed in a linear array but without a separate feed network as in the case of the embodiment of FIGS. 3*a*(1) and 3*a*(2). FIG. 3*b*(1) shows the RF signal paths while FIG. 3*b*(2) shows the control signal paths.

In both of the aforementioned embodiments (depicted by FIGS. 3*a*(1) and 3*a*(2) and FIGS. 3*b*(1) and 3*b*(2)), only a few of the control signal paths are depicted for ease of illustration, it being understood that each control element 24 would preferably be connected with a separate output of the DAC.

In the embodiments of the invention shown in FIGS. 3*a*(1) and 3*a*(2) and in FIGS. 3*b*(1) and 3*b*(2), these embodiments each has one or more linear arrays of shorter holographic antennas 20. Only one linear array of shorter holographic antennas 20 is shown in these embodiments for ease of illustration, it being understood that in practice, multiple linear arrays of shorter holographic antennas 20 may be utilized which are disposed more or less parallel to each other. Each linear array can have any number of groups of shorter holographic antennas 20 greater than or equal to two (only three groups 20 are shown for the embodiment of FIGS. 3*a*(1) and 3*a*(2) and only three groups 20 are shown for the embodiment of FIGS. 3*b*(1) and 3*b*(2), for ease of illustration). Each group comprises a shorter holographic antenna 20 which is comprised of a series (group) of conductive elements 22 that are spaced from each other by less than a wavelength (λ). In preferred embodiments spacing of the conductive elements 22 equals λ/6. But a conductive element 22 spacing of less than λ/2 is sufficient. Each holographic antenna element 20 is comprised of a group of multiple conductive elements 22. Holographic antenna elements 20 may be greater than 2λ in length and preferably contain six or more conductive elements 22 (eight are depicted for the embodiments of FIGS. 3*a*(1)/3*a*(2) and 3*b*(1)/3*b*(2)). The number of conductive elements 22 in a group may in the hundreds or even thousands. But in practice, the number of elements 22 in a group comprising a shortened holographic antenna element 20 are more preferably in the range of 20 to 40. Impedance tuning elements 24 are disposed between neighboring conductive elements 22 in row of conductive elements 22. Two impedance tuning elements 24 are shown in FIGS. 3*a* and 3*b* between each neighboring pair of conductive elements 22 within a single holographic antenna element 20. Any number of impedance tuning elements 24 greater than or equal to one may be disposed between neighboring pairs of conductive elements 22 within a single antenna element 20. The impedance tuning elements 24 may be embodied by any device that can electronically control the impedance (reactance) of tuning element 24. Exemplary tuning elements 24 include varactor diodes, PIN diodes, Schottky diodes, RF switches, tunnel diodes, transistors, MEMS switches, and tunable dielectric elements. The tuning elements 24 are tuned electronically by applying voltage or current biases to them (from the DACs) to change the effective index of the traveling wave at each tuning element 24 position such that the index achieves or approximates the condition of either Eqn. 2 (above for embodiments having phase delay matched feed lines 43 and antenna elements 20) or Eqns. 3-5 (below for embodiments not having phase delay matched feed lines 43 and antenna elements 20).

In the embodiment of FIGS. 3*a*(1) and 3*a*(2) the phase shifts of the amplifiers 26 do not cause destructive interference if it is assumed each amplifier 26 is identical. However the amplifiers must be fed with the same phase that would have existed with the prior art antenna of FIG. 1 to achieve beam scanning. This phasing can be achieved by assuring that the feed line 42 (which runs essentially parallel to a major axis of the array of holographic antenna elements 20) has the same phase velocity as the array of holographic antennas 20, but this adds an additional design constraint to the embodiment of FIGS. 3*a*(1) and 3*b*(2) compared to the embodiment of FIGS. 3*b*(1) and 3*b*(2). Instead, as will be seen with reference to the embodiment of FIGS. 3*b*(1) and 3*b*(2) (discussed further below), the impedance pattern of its antenna elements 20 can be individually compensated for based on the input phase to each antenna element 20. This removes the requirement for the feed network and for the antenna to be phase managed. Also, if the a separate feed line is utilized, as in the case of the embodiment of FIGS. 3*a*(1) and 3*b*(2), but the amplifiers 26 are not identical phase-delay wise and/or the feed line 42 is not (perfectly) matched to the antenna elements 20 phase-delay wise, then the technique which is described below regarding phase compensating the individual antenna elements may be utilized.

Figure 4A:
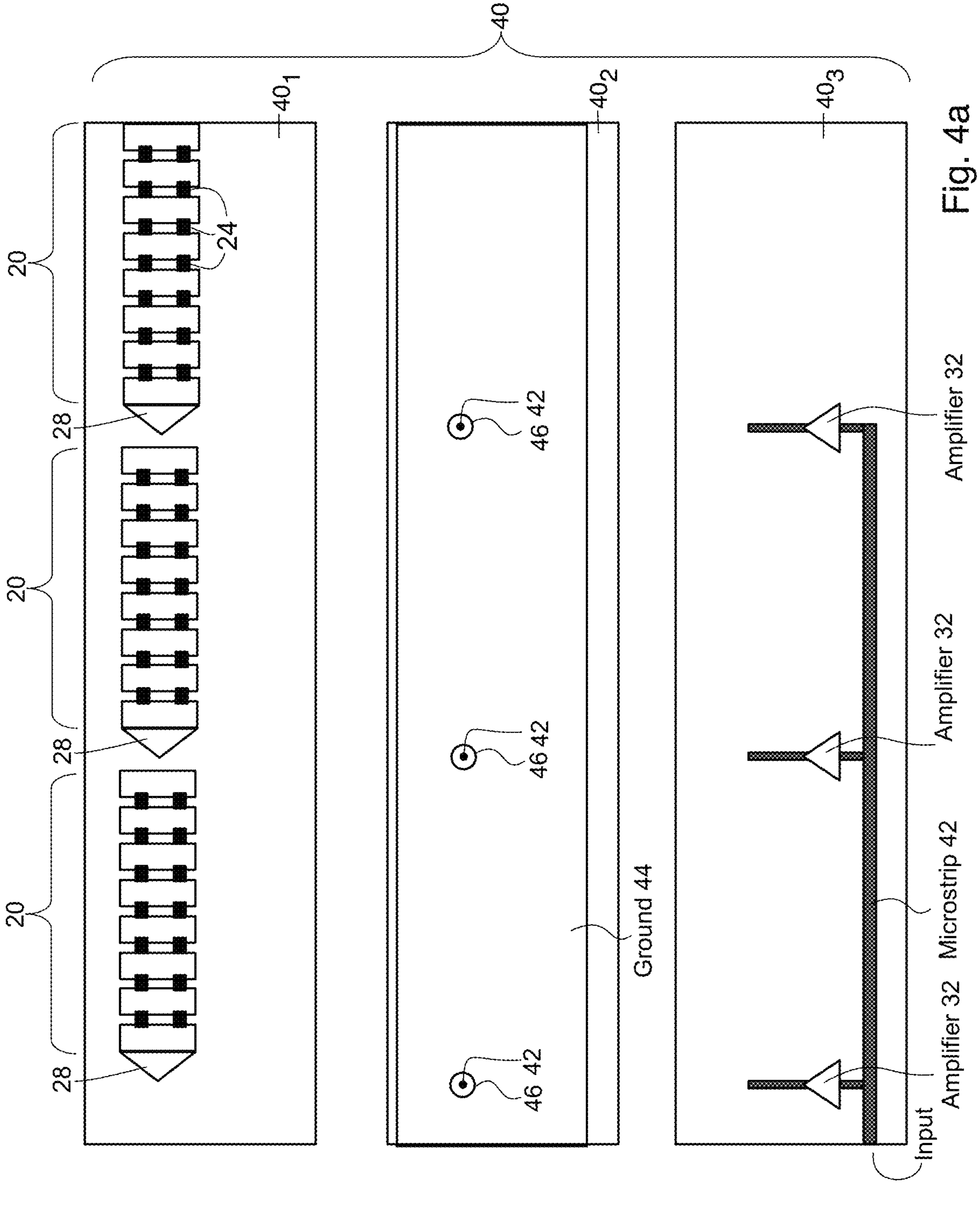
FIG. 4*a* is a plan view of the three layers of a three layered printed circuit embodiment of the corresponding to the embodiment of FIG. 3*a*.
Figure 4B:
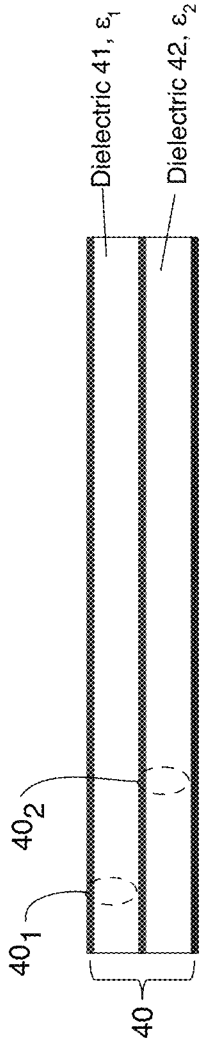
FIG. 4*b* is a side elevational view of the three layered printed circuit embodiment of FIG. 4*a*, with the widths of the dielectric layers being enlarged for ease of illustration.

FIGS. 4*a* and 4*b* depict an embodiment of an antenna with a feed network where the feed network of FIG. 3*a*(1) is embodied as a microstrip line 42 disposed in a layer $\mathbf{40}_3$ adjacent, but spaced and insulated from a ground plane 44 (layer $\mathbf{40}_2$). The holographic antenna elements 20 are disposed in a layer $\mathbf{40}_1$ which is also adjacent, spaced and insulated from, but on an opposite side of, the ground plane 44 of layer $\mathbf{40}_2$. FIG. 4*a* is a plan view of each of the three layers $\mathbf{40}_1$, $\mathbf{40}_2$ and $\mathbf{40}_3$ of a three layered printed circuit board 40. FIG. 4*b* is a side elevational view showing the three layers $\mathbf{40}_1$, $\mathbf{40}_2$ and $\mathbf{40}_3$ on top of each other and also more clearly depicting the dielectric material of each layer. Any dielectric material associated with layer $\mathbf{40}_3$ is preferably removed during manufacture or if it remains, then its dielectric constant should be considered as it would likely affect the phase velocity of the phase velocity of the microstrip line 42. The dielectric constant $\varepsilon_1$ of the dielectric material 41 of $40_1$ (and its thickness) as well as the dielectric constant $\varepsilon_2$ of the dielectric material 42 of $40_1$ (and its thickness) the of the multilayered printed circuit board 40 are selected so the phase velocity of the microstrip mode of the microstrip line 42 on layer $40_3$ matches the average phase velocity of the traveling wave antenna formed by the array of holographic antenna elements 20 on layer 401. These phase velocities can be determined by doing simulations or modeling.

Figure 4C:
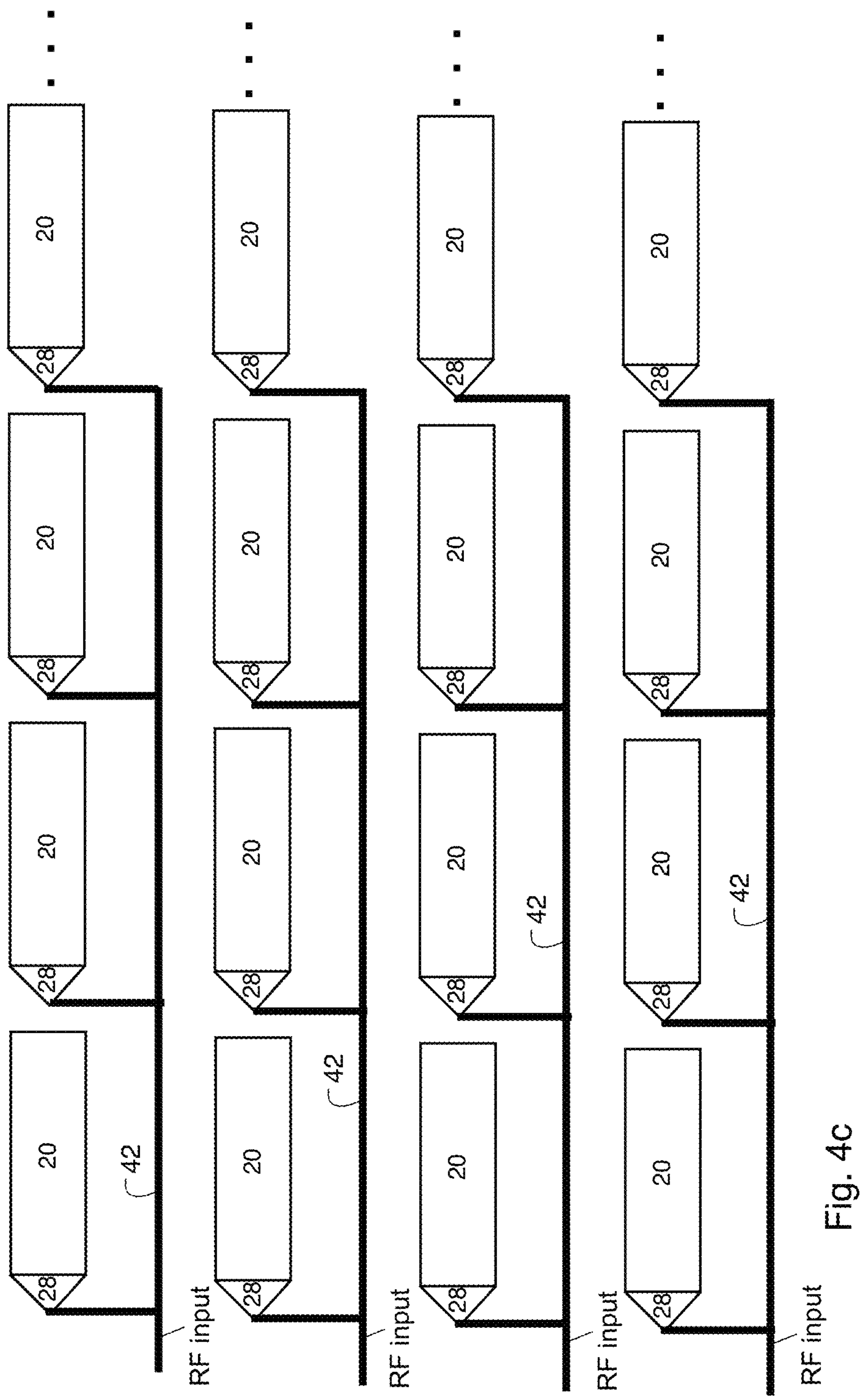
FIG. 4*c* is a plan view of a upper layer of an embodiment of a three layered printed circuit embodiment similar to that of FIGS. 4*a* and 4*b*, but with multiple linear arrays of shorter holographic antenna elements being disposed in parallel to each other.
Figure 5:
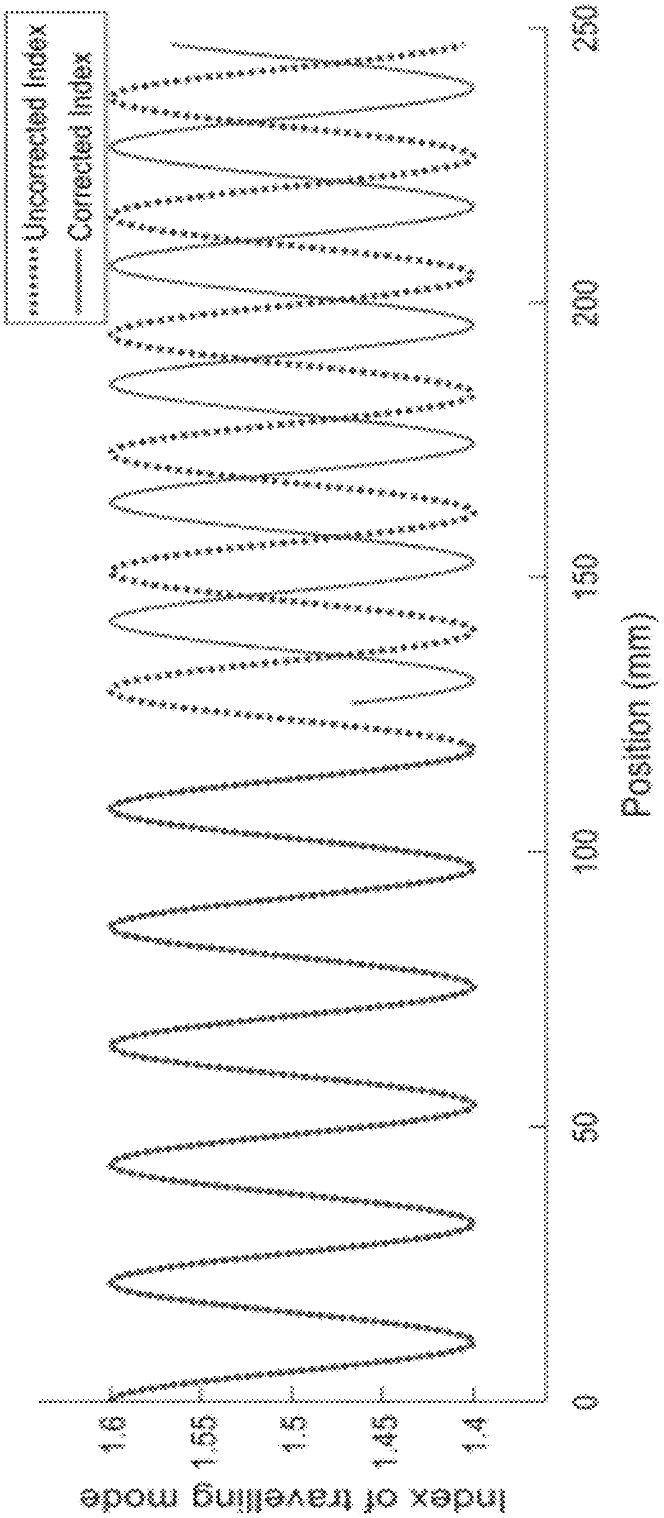
FIG. 5 demonstrates that for a corrected antenna, the holographic modulation is corrected by 150 degrees to account for the incorrect input phase of an uncorrected antenna.

The bottom (or feed) side or layer $40_3$ of the multilayered printed circuit board 40 supports the microstrip line 42 and amplifiers 32. A middle (or ground) layer $40_2$ of the multilayered printed circuit board 40 provides the ground plane 44 (made of a metal such as copper or aluminum, for example) with openings or vias 46 therein. The upper (or antenna) layer $40_1$ of the multilayered printed circuit board 40 has three shorter holographic antennas 20, the inputs of which are connected to the microstrip lines at the outputs of amplifiers 32 since the microstrip lines 42 at the outputs of amplifiers 32 preferably pass through the depicted openings or vias 46 in the ground plane 44 to antenna feed element 28 of each of the shorter holographic antennas 20. The antenna feed elements 28 may be simply embodied as a triangularly shaped pieces or layers of metal (such as copper or aluminum, for example), but the antenna feed elements 28 may be of a more complicated design including a stack of metallic and insulating layers (not shown). Three of the shorter holographic antennas 20 are shown in a single linear array in this embodiment, it being understood that the number of shorter holographic antennas 20 in a linear array may be far greater and that multiple linear arrays each having a plurality of shorter holographic antennas 20 may be disposed parallel to each other as depicted by FIG. 4*c*. FIG. 4*c* depicts an upper layer $40_1$ of a multilayered printed circuit board similar to the embodiment of FIGS. 4*a* and 4*b*, but with four parallel linear arrays of holographic antennas each of which comprises an array of shorter holographic antennas 20.

In one embodiment of the antenna, an amplifier 26 is provided between each antenna feed 28 and the RF feed line 42. A modification of this embodiment may have an amplifier only at the RF input. A RF coupler (not shown) preferably takes power from the feed line 42 into each antenna element 20. An antenna feed element 28 at the input of each antenna element 20 may comprise an impedance transformer that transforms the impedance of the feed line 42 to the impedance of the shortened holographic antenna element 20.

In the embodiments of FIGS. 3*a*(1), 3*a*(2), 3*b*(1), 3*b*(2), 4*a*, 4*b* and 4*c*, the conductive elements 22 are rectangularly shaped, but this is not necessarily a design constraint as other geometric shapes may be utilized for conductive elements 22. Moreover, in these embodiments, the spacing between neighboring conductive elements 22 is λ/6, and the dimension (width w) of each conductive element 22 along the length of the antenna is λ/6 or about 0.25 mm when the nominal wavelength that the antenna is tuned for is 1.5 mm. This leaves a 0.25 mm gap between neighboring conductive elements 22 (when the nominal wavelength that the antenna is 1.5 mm), and tuning elements 24 such as diodes can then be attached directly by soldering between neighboring conductive elements 22. The gaps will be narrower at higher frequencies, so other means may be needed to attach the tuning elements 24 to their conductive elements 22. Wider gaps can be used for larger diodes, or a tab can be used on top of a wider gap such that the diode is attached to a tab on either edge of neighboring conductive elements 22.

The shapes of the conductive elements 22 do not necessarily need to be rectangular as noted above. Indeed, non-rectangular conductive element 22 geometries are also viable such as any polygon, regular or irregular. Overall it is the capacitance between adjacent conductive elements 22 that effects the wave propagation and antenna's characteristics. For ease of fabrication the shape of the conductive elements 22 may include some feature which allows a tuning element 24 to be attached easily. In the direction transverse to the linear array of holographic antenna elements 20 the conductive element 22 can be any dimension (height h) from significantly smaller than a wavelength to dozens or hundreds of wavelengths. Preferably the height h dimension is between λ/2 and λ. At this size the elements 22 are small enough to be arrayed in the transverse direction and achieve beamforming in the far field. Although the arrays of holographic antenna elements 20 are described as being "linear" herein, the term should not be taken too literally. The arrays of holographic antenna elements 20 may be easily implemented using printed circuit board technologies, as is described with reference to the embodiment of FIGS. 4*a*-4*c*, and printed circuit boards can be conformal (or just curved), so, they do not necessarily need to be planar. The term "linear" herein is intended to include a following the path of a line which may be located on a curved surface or on a planar surface.

Two mechanisms can be used to ensure that the holographic antenna elements 20 are properly phased to achieve beam scanning:

(1) Phase-matched feed line—see the embodiments of FIGS. 3*a*(1), 3*a*(2), 4*a* and 4*b*—using this technique, the phase velocity of the wave traveling along the array of holographic antenna elements 20 and the wave traveling along the feed line 42 are matched as close as reasonably possible. This technique ensures that each antenna element 20 receives the same input phase as if would have received if there were only a single feed at the front. Multiple techniques can be used to match the phase velocities of the antenna and feed line. The preferred technique uses different dielectric constants (if needed) for the feed line 26 dielectric material 42 and antenna elements 20 dielectric material 41 to try to ensure phase matching. A desired phase velocity can also be achieved by choosing specific impedance properties of the tuning elements 24, or modifying the geometry of the feed line or antenna structure, so controlling the dielectric constants $\epsilon_1$ and $\epsilon_2$ are not the only means of effecting this result. This technique requires more design effort than the second technique but it tends to result in a broader bandwidth.

(2) Holographic phase correction—see the embodiments of FIGS. 3*a*(1) and 3*a*(2) (but assuming that, in this embodiment, the separate feed line 42 is not phase matched to the antenna elements 20 so the phase delays of the feed line 42 and the antenna elements 20 are set arbitrarily) and the embodiment of FIGS. 3*b*(1) and 3*b*(2) (which has no separate feed line). The holographic pattern on each antenna element 20 is adjusted to account for variations in the phase in these embodiments. This method is simple to implement but tends to be more narrow banded. The holographic pattern on each antenna element 20 is adjusted to account for variation in the phase preferably by a periodic control signal applied to the rows of tuning elements 24. This could be done with phase shifters (not shown) disposed at the input of each amplifier 32.

Control signals are generally applied to the rows of tuning elements 24 as voltages or currents. This may be done by connecting metal traces 25 to each row with a digital-toanalog converter DAC as shown by FIGS. 3$a$(2) and 3$b$(2). The DAC(s) is (are) connected to a digital bus 27 which received data from a microprocessor (for example and not shown). The DAC(s) would provide for electronic control of variable $K_p$ in Eqn. 2 above or variables $K_p$ and φ in Eqn. 3 below or the variables $K_p$ and the various subscripted versions of φ in Eqns. 4 and 5 below. The antenna is preferably tuned to account for the existence of these metal traces 25. Alternatively, using optically controlled tuning elements, such as an optically controlled MEMS device, the tuning signal is light (a laser beam, for example, which is preferably waveguide confined in a optical fiber) as opposed to a current or voltage. In such an embodiment, the metallic control lines (traces 25) are not needed and an optical control signal is applied via fiber or free space optics thereby avoiding issues with metal traces (for the control lines) affecting the tuning of the antenna. In such an optical control embodiment, traces 25 may be viewed as being embodied as optical waveguides.

In the embodiment of FIGS. 3$b$(1) and 3$b$(2) there is no separate feed line running more or less parallel to the array of holographic antenna elements 20. Since there is no feed line in this embodiment, a feed line it is no longer a design constraint whose phase velocity should be matched to that of linear array of shorter holographic antenna elements 20. But this means that some other method should be used to correct for the phase shifts that are imposed by its amplifiers 32. In this embodiment, the RF input feeds the first antenna element 20, and each subsequent shorter holograph antenna element 20 in the linear array of same is fed in series. An amplifier 32 is placed between each antenna element 20. Prior art disclosures have used specifically suggested negative impedance converter amplifiers because these amplifiers do not disrupt the phase of the traveling mode. In this embodiment, any amplifier can be used, and a holographic phase correction is applied to correct for the phase shift of the amplifier. This is preferably done by altering the holographic interference pattern applied to the holographic antenna elements 22 to account for the phase shift of each amplifier 32 in the linear array of shorter holograph antenna elements 20.

In the embodiment of FIGS. 3$b$(1) and 3$b$(2), the amplifiers 32 are loaded in series along the antenna and preferably between antenna elements 20 (which is in contrast to the embodiment of FIGS. 3$a$(1), 3$a$(2), 4$a$ and 4$b$ where its amplifiers 26 are connected in a more parallel-like arrangement). By periodically amplifying the traveling wave, the antenna more efficiently uses its aperture area thereby improving gain. The challenge in this embodiment is that traditional amplifiers impose a phase shift on the traveling wave which disturbs the holographic interference pattern. This is overcome by applying a phase correction to the holographic pattern after each amplifier 32 to account for the transmission phase of these amplifiers 32. This phase correction is preferably implemented by adjusting voltages applied to the conductive elements 22. This changes the voltage bias that each tuning element 24 receives. We therefore update the modulation, see equation 2 (Eqn. 2), that is applied. This is described in more below by equation 3 (Eqn. 3). These corrections cascade for each amplifier 32, and so each subsequent correction is stacked on top of the previous correction. The result is that each element 20 (each comprising a group of conductive elements 22) of the antenna radiates in phase constructively despite the phase shifts of the amplifiers. Equation 3 (Eqn. 3) shows the correction to Equation 2 (Eqn. 2) to create a properly phased two holographic antenna element 20 linear array:

$$\text{For } x<L/2\text{: } n_s(x)=n_{avg}+M\cos(k_p x)$$

$$\text{For } x>L/2\text{: } n_s(x)=n_{avg}+M\cos(k_p x+\varphi) \qquad \text{(Eqn. 3)}$$

where $n_s$ is the position of the varying index along the antenna, L is the total length of a two holographic antenna element 20 linear array, and φ is the correction applied to correct for phase errors in the second amplifier in the series or feed network, as needed. If the amplifiers 32 are identical from a phase delay perspective and if the feed network does not introduce phase delays which require correction, then the φ correction variable may be zero. But having the ability to correct such phase delays should they arise in as built equipment is a desirable feature. The other terms are defined above with respect to Eqn. 2.

Equation 3 (Eqn. 3) can be generalized to allow for any number of antenna elements 20 to be arrayed in a linear series as shown in Eqn. 4 and Eqn. 5 (below) which are for shorter holographic antenna element 20 linear arrays having 3 or 4 elements 20, respectively:

$$\text{For } x<L/3\text{: } n_s(x)=n_{avg}=M\cos(k_p x)$$

$$\text{For } L/3\leq x<2L/3\text{: } n_s(x)=n_{avg}=M\cos(k_p x+\varphi_1)$$

$$\text{For } X\geq 2L/3\text{: } n_{avg}=M\cos(k_p x+\varphi_2) \qquad \text{(Eqn. 4)}$$

$$\text{For } x<L/4\text{: } n_{avg}=M\cos(k_p x)$$

$$\text{For } L/4\leq x<L/2\text{: } n_s(x)=n_{avg}=M\cos(k_p x+\varphi_1)$$

$$\text{For } L/2\leq x<3L/4\text{: } n_s(x)=n_{avg}=M\cos(k_p x+\varphi_2)$$

$$\text{For } x\geq 3L/4\text{: } n_s(x)=n_{avg}=M\cos(k_p x+\varphi_3) \qquad \text{(Eqn. 5)}$$

The numeral index on the correction value $\varphi_n$, is n where n=1 for the first series-connected amplifier 32 (that is an amplifier series connected between elements 20 in the array). For the embodiment of FIGS. 3$b$(1) and 3$b$(2) which has a number of shorter holographic antenna elements 20 in a linear array, the values of φ are associated with particular amplifiers 32 as identified thereon according to Eqn. 4.

Figure 7:
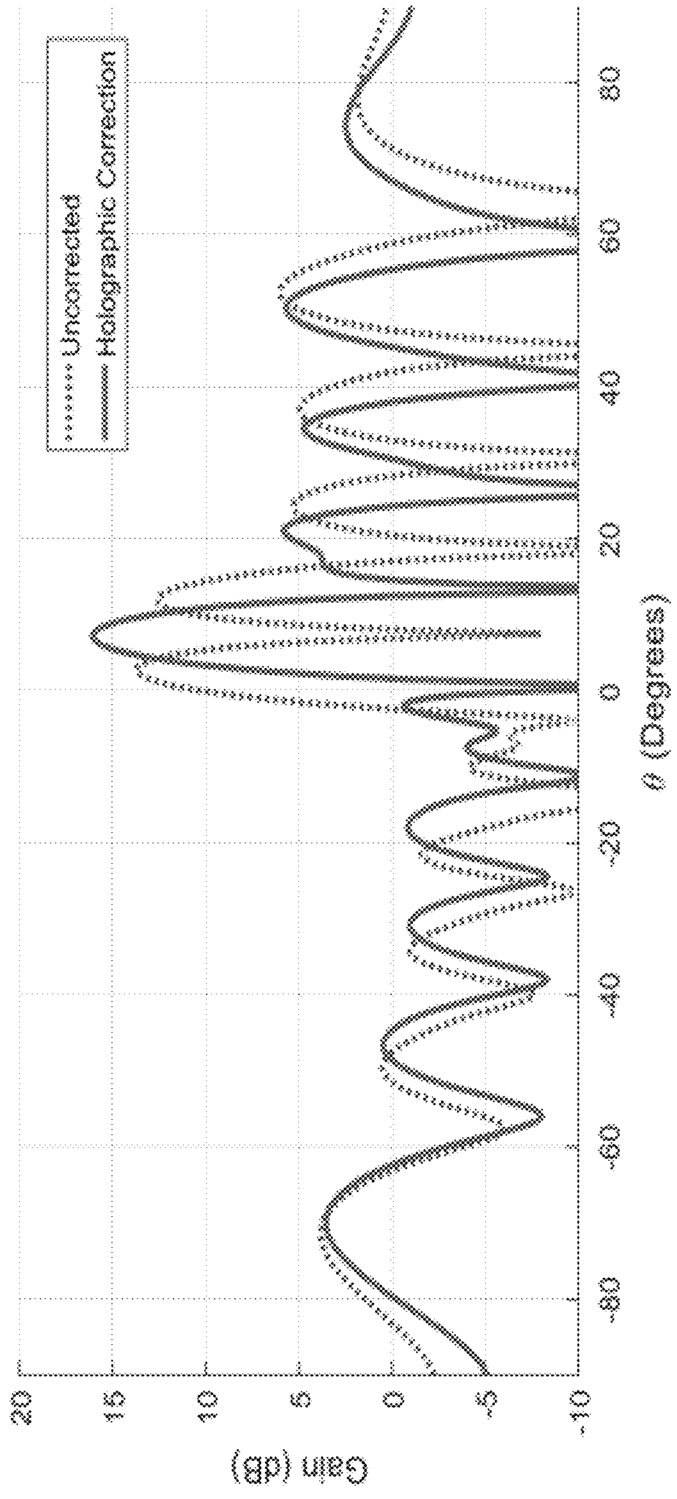

The phase correction adjusts the modulation applied to the antenna as shown in FIG. 7. In the uncorrected version, the modulation is a single cosine which is applied along the entire length of the antenna as described in equation 2. For a design with two shorter holographic antenna elements 20, the modulation must be corrected at the location of the antenna element as described in Eqn. 3 (assuming the second antenna element 20 in the linear series is located at L/2). In FIG. 7 this correction of the modulation is represented by a discontinuity in the index at the position of the amplifier. The phase of the modulation is altered here to counteract the phase shift imposed by the amplifier located at L/2.

Figure 6:
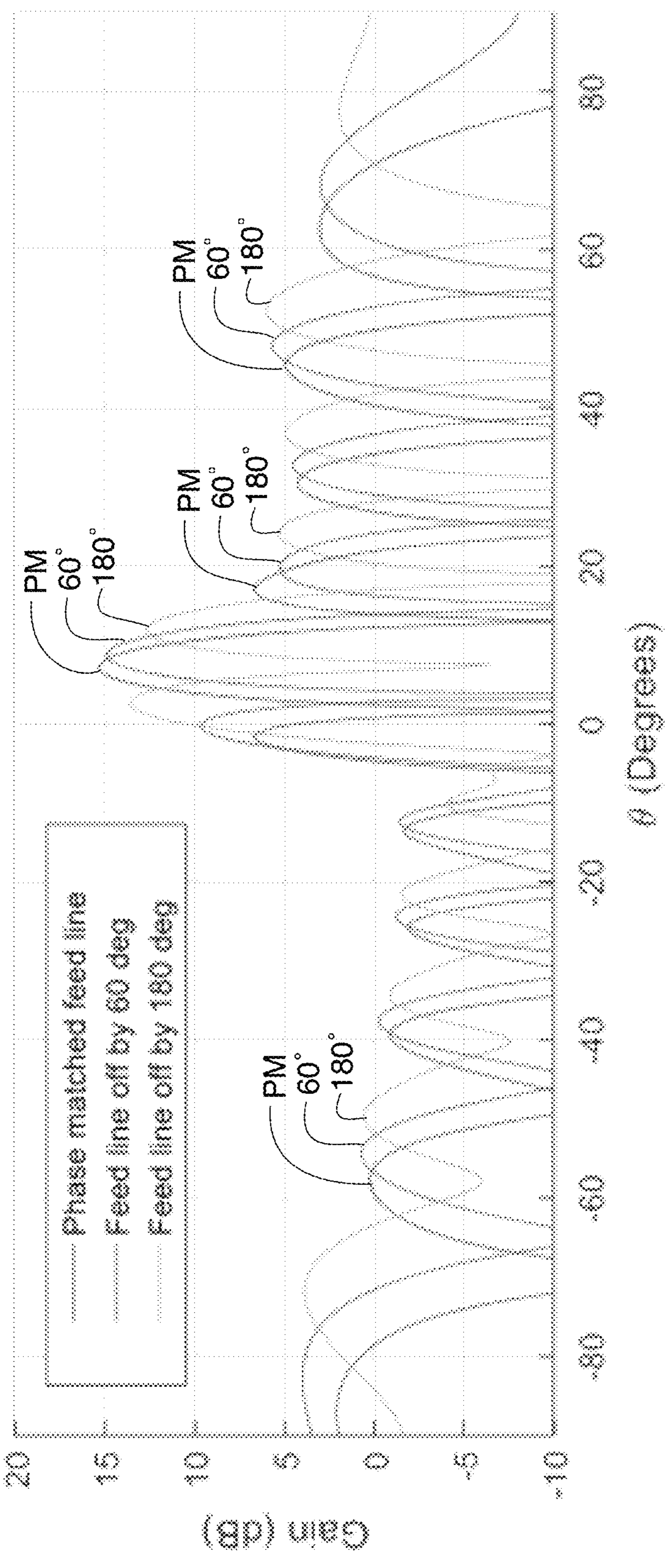
FIGS. 6 and 7 show the results of two different simulations of a two element holographic array.

FIG. 6 shows the results of a simulation of a two element holographic array fed with a phase matched traveling wave feed and thus corresponding to the embodiment of FIGS. 3$a$(1) and 3$a$(2). When the phase input to each antenna element is correct, the main beam is at 15.4 dB and the sidelobes are at 6.7 dB. If the feed line does not have matching phase velocity, and the second element is fed 60 degrees off from optimal, the main beam drops to 15.0 dB and shifts 1.5 degrees, and the sidelobes increase to 9.7 dB. When the 2nd feed is fed 180 degrees off, the main beam is removed by destructive interference and two sidelobes exists instead with similar gain.

FIG. 7 shows the results of a simulation of a two holographic antenna element 20 holographic linear array fed with a phase matched traveling wave feed. Thus this simulation was done on an embodiment basically corresponding to the embodiment of FIGS. 3*a*(1) and 3*a*(2), except that in the simulation the simulated embodiment had only two holographic antenna elements 20 holographic the linear array. The holographic antenna elements 20 are fed in phase despite the fact that the second antenna element in the linear array should be 150 degrees ahead based on the phase due to the traveling wave mode.

For both corrected and uncorrected embodiments beam scanning is achieved by setting the periodicity of the modulation $k_p$. The scan angle can then be calculated from Eqn (1) above.

If Printed Circuit boards noted above are too big for the frequencies of interest, then the antennas described herein can be built up instead by using MEMS type fabrication techniques or even chip level technologies to reduce their physical sizes.

The disclosed holographic antenna is set up as a transmitting antenna. It can be converted to a receiving antenna by reversing the directions of the various amplifiers such that the antenna's RF input then becomes a RF output instead. The term "RF connection" herein refers to the RF input when the antenna is configured as a transmit antenna and is also refers to the RF output when the antenna is configured as a receive antenna.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Section 112, as it exists on the date of filing hereof, unless the element is expressly recited using the phrase "means for . . . " and no method or process step herein is to be construed under those provisions unless the step, or steps, are expressly recited using the phrase "comprising the step(s) of . . . "

Modifications, additions, or omissions may be made to the systems, apparatuses, and methods described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order. As used in this document, "each" refers to each member of a set or each member of a subset of a set.

What is claimed is:

1. A holographic antenna having a RF connection, the holographic antenna comprising:

a. a plurality of conductive elements arranged in a series of said conductive elements, said series of conductive elements being grouped a number of different groups of said conductive elements, each of said conductive elements in each said different group of conductive elements being connected via one or more tuning elements to a neighboring conductive element in each said different group of conductive elements, each said different group of conductive elements comprising a holographic antenna element of said holographic antenna;

b. a plurality of amplifiers, each one of said plurality of amplifiers being connected at one end of each one of said different groups of conductive elements;

c. a feed system coupling each of said amplifiers to said RF connection.

2. The holographic antenna of claim 1 further including a plurality of antenna feed elements, each one of said plurality of antenna feed elements being associated with and connected to a corresponding one of said plurality of amplifiers and also being connected to a first one of conductive elements in each of said groups of conductive elements.

3. The holographic antenna of claim 2 wherein each of said conductive elements has a geometric shape and each of said antenna feed elements has a triangular shape with one side of the triangular shape of each feed element abutting one side of the first one of conductive elements in each of said groups of conductive elements.

4. The holographic antenna of claim 3 wherein the geometric shape is a rectangular shape.

5. The holographic antenna of claim 1 wherein the feed system comprises a feed line which is disposed essentially parallel to a linear arrangement of said number of different groups of said conductive elements.

6. The holographic antenna of claim 5 wherein the feed system comprises a plurality of microstrip lines interconnecting amplifiers associated with and connected to each of different groups of said conductive elements.

7. The holographic antenna of claim 5 wherein the feed system is spaced from said linear arrangement of said number of different groups of said conductive elements.

8. The holographic antenna of claim 7 wherein said linear arrangement of said number of different groups of said conductive elements is disposed on a first dielectric surface disposed on one side of a ground plane and said feed system is disposed on a second dielectric surface disposed on another side of a ground plane.

9. The holographic antenna of claim 8 wherein each of the different groups of said conductive elements has an associated amplifier disposed on said second dielectric surface and wherein said feed system comprises a plurality of microstrip lines interconnecting each associated amplifier with (i) said RF connection and (ii) with a first one of conductive elements in each of said groups of conductive elements with which the associated amplifier is associated.

10. The holographic antenna of claim 1 wherein the feed system including its amplifiers have a phase delay associated therewith which is matched to a phase delay associated to said linear arrangement of said number of different groups of said conductive elements.

11. The holographic antenna of claim 5 wherein said plurality of conductive elements are arranged in a two dimensional array, with said groups of said conductive elements each comprising one of said holographic antenna elements also being arranged in a two dimensional array thereof.

12. The holographic antenna of claim 1 wherein said tuning elements comprise varactor diodes.

13. The holographic antenna of claim 1 wherein said tuning elements are each connected to a DAC for electronic control of the impedance of each of said tuning elements.

14. The holographic antenna of claim 13 wherein the electronic control of the tuning elements affect an angle at which the holographic antenna scans.

15. The holographic antenna of claim 14 wherein the electronic control of the tuning elements also compensates for undesirable phase delays occurring in said amplifiers and/or in said feed system.

16. A holographic antenna comprising a plurality of conductive elements, the plurality of conductive elements being grouped into a plurality of different groups thereof, each different group having an associated amplifier for applying an amplifier RF signal to its associated group of conductive elements, each associated group of conductive elements having interconnecting tuning elements and each amplifier having a phase delay which is at least partially compensated for by applying appropriate signals to said tuning elements to thereby alter an impedance pattern of the associated group of conductive elements following their associated amplifier.

17. The holographic antenna of claim 16 wherein each associated group of conductive elements is disposed on a first dielectric surface disposed on one side of a ground plane.

18. The holographic antenna of claim 17 wherein an input of each of said amplifiers is connected with a feed system conveying a RF signal to said amplifiers, said feed system being disposed on a second dielectric surface disposed on another side of said ground plane.

19. The holographic antenna of claim 18 wherein said tuning elements are connected to a DAC for electronic control of the impedance of each of said tuning elements.

* * * * *